Oct. 29, 1940.  KARL-HEINRICH SCHULZE  2,219,662
HARVESTING AND SHEAVING OR LIKE MACHINE
Filed April 7, 1939
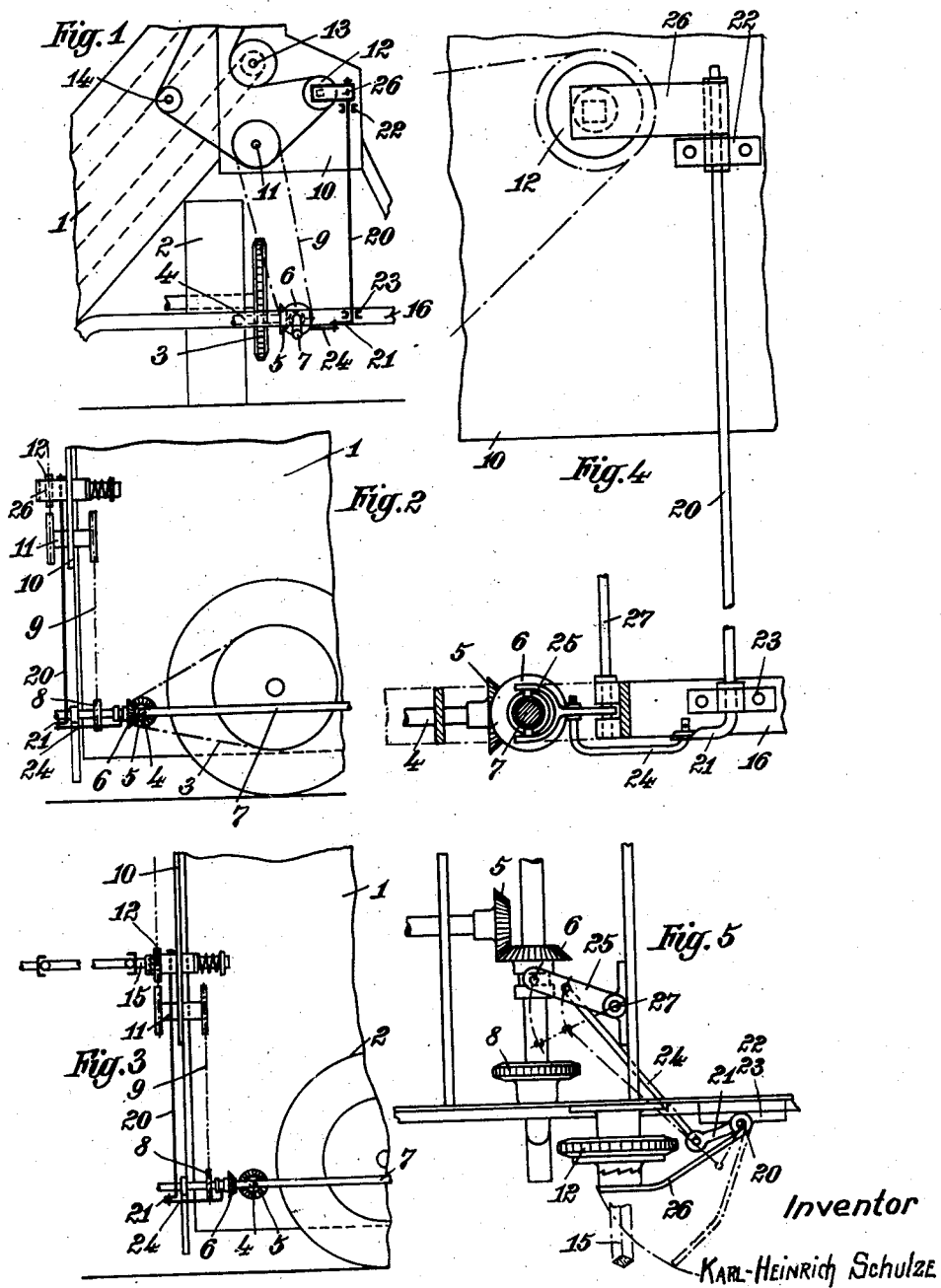
Inventor
Karl-Heinrich Schulze
By Karl A. Mayr.
Attorney Patented Oct. 29, 1940

2,219,662

UNITED STATES PATENT OFFICE 2,219,662

HARVESTING AND SHEAVING OR LIKE MACHINE

Karl-Heinrich Schulze, Mannheim, Germany, assignor to Heinrich Lanz Aktiengesellschaft, Mannheim, Germany Application April 7, 1939, Serial No. 266,507
In Germany April 11, 1938

3 Claims. (Cl. 56—22)

This invention relates to harvesting and sheaving or like machines, which can be operated selectively by contact with the ground or by way of a drive derived from a tractor or the like.

It is the object of the invention to make the two drives, i. e., the ground drive and the tractor drive, dependent on one another, in such a way that only the one of these can be made effective at any particular time.

In the accomplishment of this object there is provided in conjunction with the disengaging means for the ground drive a locking means which, when the ground drive is operative, locks the transmission shaft communicating the drive from the tractor, or releases the same when the ground drive is disconnected.

An embodiment of the invention is illustrated diagrammatically by way of example in the accompanying drawing, in which Fig. 1 is a front view of the appertaining parts in the position in which the drive is effected by contact with the ground, Fig. 2 being an elevation.

Fig. 3 is an elevational view of the parts for the tractor drive, whilst

Figs. 4 and 5 are elevational and plan views of the locking and releasing means on enlarged scale.

The harvesting machine I is adapted for operation solely by contact with the ground or solely by means of a tractor or the like, selectively as desired. The ground drive (Figs. 1 and 2) is obtained from the running wheel 2, the rotation of which is transmitted by way of a chain wheel 3 to an intermediate gear 4 and by way of a bevel gear 5, 6 to the knife shaft 7.

The knife shaft 7 drives the remaining parts of the harvester, for example by way of the chain wheel 8 and the chain 9 the intermediate gear 11, which in turn by way of a further intermediate gear 12 causes the rotation of the conveyor 13, 14.

Assuming the harvester is to be driven solely by the tractor (Fig. 3) it is necessary to disengage the ground drive, and in the embodiment illustrated in the drawing this is effected by bringing about the disengagement of the bevel wheel 6 mounted on the shaft 7. The point of connection with respect to the transmission shaft 15 transmitting the power from the tractor is assumed to be the intermediate gear 12. If desired, however, the power can also be transmitted at any other suitable point. The drive taking effect by way of the intermediate gear 12 occurs in the same direction as in the case of the ground drive, proceeding by way of the conveyor 13, 14 to the intermediate gear 11 and from the latter to the knife shaft 7.

To prevent the ground drive and the tractor drive from being effective simultaneously there is provided between the disengaging means for the ground drive and the point of connection of the transmission shaft a locking means which, in the operative condition of the ground drive, positively locks the connection with the tractor drive and, when the tractor drive is in operation, positively prevents the engagement of the ground drive.

This locking means comprises the angularly bent rod 20, 21, which is conducted in the head piece from the frame 16 of the harvester up to the intermediate gear 12 and is rotatably mounted in the bearings 22 and 23. The short arm 21 is pivotally connected by means of the rod 24 to the disengaging fork 25 for the ground drive, whilst the upper end of the longer rod arm 20 is furnished with a trap leaf 26. The disengaging fork 25 is actuated by a control 27.

In the effective condition of the ground drive, i. e., when the bevel wheels 5 and 6 are in engagement, the trap leaf 26 bears against the end face of the intermediate gear 12 and blocks the connection with respect to the transmission shaft 15, as shown in full lines in Fig. 5. Upon the disengagement of the ground drive, however, which is brought about by moving the wheel 6 out of engagement with the wheel 5, the rod 20, 21 is rotated positively in the bearings 22 and 23, and the trap 26 is lifted away from the intermediate gear 12, or other point of connection with the tractor drive, as indicated in Fig. 5 in dash-dotted lines. The locking means remain effective during the time when the tractor drive is in operation, as the transmission shaft prevents the trap from being moved over, and accordingly the bevel wheel 6 from being moved into engagement with the wheel 5.

What I claim as new and desire to secure by Letters Patent is:

1. In a harvesting and sheaving or like machine, drive means for driving the machine by contact with the ground, connecting means for connecting the machine with an external power source for driving the machine irrespectively of the ground drive, disconnecting means for disconnecting the said ground drive, and blocking means operatively connected with said disconnecting means for positively blocking the connection with the external power source when the ground drive is effective and for positively releasing the said connection when the ground drive is disconnected.

2. In a harvesting and sheaving or like machine, drive means including cooperating bevel gear wheels for driving the machine by contact with the ground, connecting means for connecting the machine with an external power source for driving the machine irrespectively of the ground drive, moving means connected with one of said wheels for moving one of the said bevel gear wheels out of engagement with the other wheel for the purpose of disconnecting the said ground drive, and blocking means operatively connected with said moving means for positively blocking the connection with the external power source when the ground drive is effective and for positively releasing the said connection when the ground drive is disconnected.

3. In a harvesting and sheaving or like machine, drive means for driving the machine by contact with the ground, connecting means for connecting the machine with an external power source for driving the machine irrespectively of the ground drive, disconnecting means for disconnecting the said ground drive and including a pair of bevel gear wheels, one of the said bevel gear wheels being displaceable into and out of engagement with the other, and blocking means for positively blocking connection with the external power source when the ground drive is effective and for positively releasing said connection when the ground drive is disconnected, said blocking means comprising an angular rod movably connected at one end to the said movable bevel gear wheel and adapted to be rotated upon displacement of said wheel, and a trap leaf provided on the other end of the said rod and being adapted to be rocked upon rotation of the said rod for establishing and interrupting the connection with the said external power source.

KARL-HEINRICH SCHULZE.